(12) United States Patent
Knirck

(10) Patent No.: US 11,214,959 B2
(45) Date of Patent: Jan. 4, 2022

(54) METHOD AND APPARATUS FOR A FIREPROOF WALL

(71) Applicant: Jeffrey Knirck, Forestville, CA (US)

(72) Inventor: Jeffrey Knirck, Forestville, CA (US)

( * ) Notice: Subject to any disclaimer, the term of this patent is extended or adjusted under 35 U.S.C. 154(b) by 0 days.

(21) Appl. No.: 16/791,688

(22) Filed: Feb. 14, 2020

(65) Prior Publication Data

US 2021/0054617 A1 Feb. 25, 2021

(51) Int. Cl.
*E04B 1/94* (2006.01)
*B32B 13/14* (2006.01)
*B32B 7/027* (2019.01)
*E04B 2/58* (2006.01)

(52) U.S. Cl.
CPC ........... *E04B 1/942* (2013.01); *B32B 7/027* (2019.01); *B32B 13/14* (2013.01); *E04B 1/945* (2013.01); *B32B 2262/10* (2013.01); *B32B 2262/108* (2013.01); *B32B 2307/3065* (2013.01); *B32B 2607/00* (2013.01); *E04B 2/58* (2013.01)

(58) Field of Classification Search
CPC . E04B 1/94; E04B 1/942; E04B 1/945; E04B 2/7409; B32B 13/14; B32B 2307/3065; B32B 2607/00; B32B 2262/108
See application file for complete search history.

(56) References Cited

U.S. PATENT DOCUMENTS

| | | | | |
|---|---|---|---|---|
| 5,678,369 | A  * | 10/1997 | Ishikawa | E04B 1/942 52/309.9 |
| 2005/0031843 | A1* | 2/2005 | Robinson | C04B 28/008 428/293.4 |
| 2010/0304078 | A1* | 12/2010 | Stol | B32B 13/06 428/98 |
| 2011/0056163 | A1* | 3/2011 | Kure | E04B 1/944 52/741.3 |
| 2016/0069079 | A1* | 3/2016 | Le Madec | E04B 5/36 52/453 |

OTHER PUBLICATIONS

"Melting Points", OnlineMetals.com, 1999, https://www.onlinemetals.com/en/melting-points (Year: 1999).*
"HARDIEBACKER cement board", Aug. 2011, JamesHardie, https://www.abcdepot.co.uk/productattachments/download/link/id/109/ (Year: 2011).*
Li et al., "Thermal properties of phase change cement board with capric acid/expanded perlite form-stable phase change material", 2017, Advances in Mechanical Engineering, vol. 9(6)1-8, https://journals.sagepub.com/doi/pdf/10.1177/1687814017701706 (Year: 2017).*

* cited by examiner

*Primary Examiner* — Jasper Saberi
(74) *Attorney, Agent, or Firm* — Heimlich Law, PC; Alan Heimlich, Esq.

(57) ABSTRACT

A Method and Apparatus for a Fireproof Wall have been disclosed. By utilizing unique and novel thermal resistance and thermal capacitance combinations a fireproof wall can be constructed.

1 Claim, 5 Drawing Sheets

METHOD AND APPARATUS FOR A FIREPROOF WALL

FIELD OF THE INVENTION

The present invention pertains to a wall. More particularly, the present invention relates to a Method and Apparatus for Fireproof Wall.

BACKGROUND OF THE INVENTION

Currently fireproof walls (aka firewalls) add considerable expense to construction costs and therefore are not widely deployed.

This presents a technical problem for which a technical solution is needed using a technical means.

BRIEF DESCRIPTION OF THE DRAWINGS

The invention is illustrated by way of example and not limitation in the figures of the accompanying drawings. Same numbered items are not necessarily alike. The accompanying Figures illustrate various non-exclusive embodiments of the invention.

DETAILED DESCRIPTION

Figure 1:
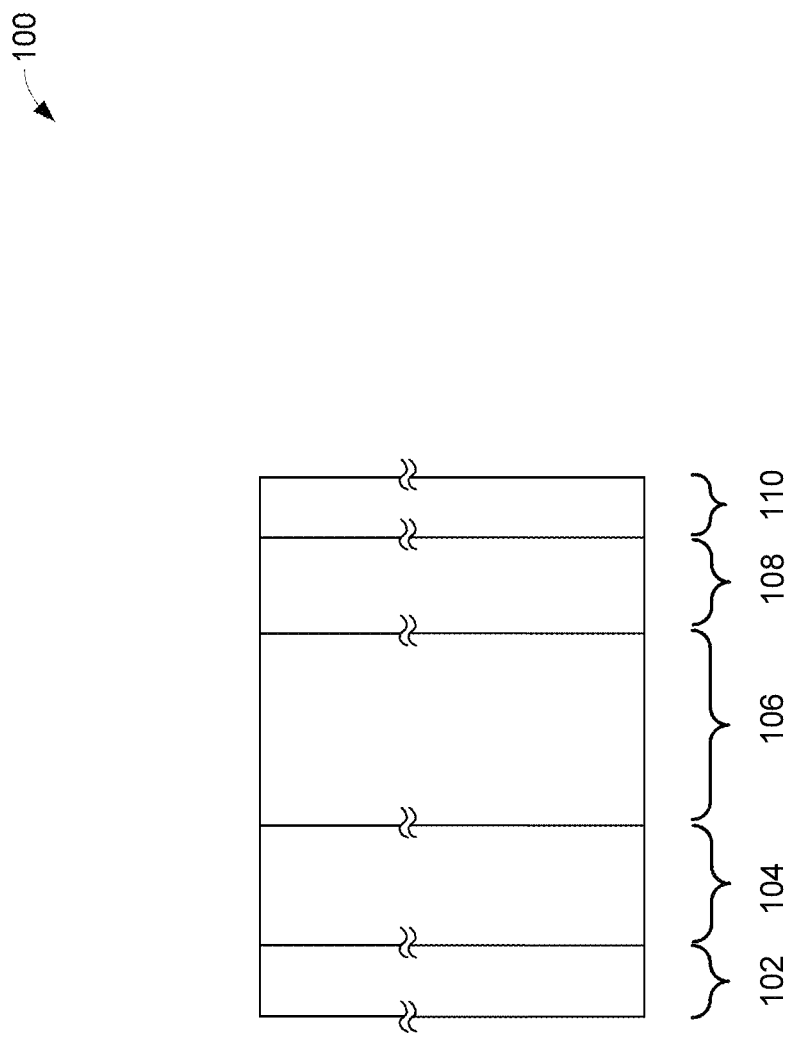
FIG. 1 illustrates, generally at 100, a cross-section view of a house wall.

A Method and Apparatus for a Firewall is disclosed.

An ideal firewall should withstand a maximum desired temperature for a maximum desired time and not lose structural integrity and exhibit low thermal diffusivity to limit heat transfer to support structures.

A typical house wall is composed of multiple layers serving various purposes. Typically, outer layers are sheets of rigid materials such as gypsum board (aka sheet rock, sheetrock, drywall, and wallboard) on an inside surface, or stucco, or other siding material, on an outside surface. Between the outer surfaces, the wall is typically filled with an insulating material, like fiber glass wool or plastic foam. That insulation typically serves the dual purposes of impeding heat transfer and sound transfer.

Additionally, the wall typically contains load bearing elements called studs, interspersed periodically in the wall, spanning from the floor to the ceiling, to support the ceiling or upper story. Such studs are typically wood boards, typically 2×4" or 2×6" in cross-section, but steel studs are also used, for increased resistance to fire and rot. Alternatively, the wall outer surfaces (or an inner member) could be structural, like plywood, forming what is commonly referred to as a Structural Insulated Panel (SIP). Alternatively, the wall could not be intended to be "load bearing", so that it only needs to support its own weight, seismic loads and side impacts.

Houses and other structures are designed, per the appropriate governmental Building Code, to resist structural failure in case of an internal or external fire source for some period of time, allowing response by a fire department to extinguish the fire. For a typical single family home, that time is typically 30 minutes of resistance to a constant heat source of approximately 2200° F. Other more "critical buildings" like hospitals, can have a resistance requirement of up to four hours in areas like stairwells. In such cases, wood or even thin steel wouldn't be practically sufficient. Even heavy steel requires thick high thermal insulation.

Fundamentally, there are two major problems with the design criteria embedded above. Most importantly is the assumption that a fire department will quell the fire within the designed resistance time. Secondly is the subtle problem for the architect, that the fire threat is a constant 2200° F. (1200° C.), for some Code required design time.

Modern buildings, especially "critical buildings" are required to (or opt to) have fire suppression systems like sprinklers (typically internally only). However, it may be that the building owner might desire to design and build a structure that is inherently truly fireproof. This goal requires three things: knowledge of the temperature-time profile of a realistic fire; a palette of building materials that can actually resist those temperatures; and a design methodology to use such materials to solve the design problem.

Specifically, it may be desired that a load bearing wall, containing thin steel studs or more substantial steel columns, be capable of structurally withstanding an unmitigated fire, either inside or outside the structure. Additionally, it may be desired that an inside wall, possibly not structural, be capable of not only withstanding an unmitigated fire, but also insulate adjacent rooms from reaching the self-ignition temperature for wood of approximately 230° C. or 450° F.

A big problem with the standard house building materials is that they fail early in a house fire. Wood has a low auto-ignition temperature at which point it becomes part of the problem. Gypsum board is typically applied over the wood stud frame, but gypsum board also fails, and then crumbles over the course of the fire, at a temperature well below the peak temperature of a room fire. Even the fiberglass wool insulation typically used inside walls softens to the point of slumping at about 900° C., and melts at 1100° C., eliminating its insulative value over the course of the fire.

As used in this description the term wall can also refer to a floor or ceiling structure or any structure needing to be fireproof.

As used in this description the term fireproof or similar language refers to the ability of a wall or floor or ceiling, etc. to withstand a given temperature profile for a given time.

While embodiments of the invention may illustrate a particular orientation of a structure, stackup, or construction, it is to be understood that the orientation is for explanation and not a required orientation. That is, embodiments having the structure, stackup, or construction in other orientations are also possible.

R or R-value is the commonly used term and is the thermal resistance of a material and has the basic units of Temperature*Area/Power. R can be related to the more physically fundamental thermal conductivity of a material, k, as $R=L/k$, where L is the thickness of the material, and k has units of power/(temperature*length). Similarly, but not generally used, C' can be the thermal capacitance of a material and then would have the basic units of Energy/(Temperature*Area). C' can be related to the more physically fundamental specific heat of a material, c, and its mass density, p, by $C'=c*p*L$.

Materials with high R values that are good for a good thermal filter tend to have low C', and materials with high C' values that are good for a good thermal filter tend to have low R.

That is, while a material may have a thermal impedance that has both resistance and capacitance derived components, in the case of thermal resistance it dominates over the thermal capacitance of the material, that is, with respect to delaying the transfer of heat through the material the resistive aspect predominates over the capacitive aspect of the material delaying the transfer of the heat through the material. While not dimensionally correct this can be thought of as R>C'. Likewise, while a material may have a thermal impedance that has both resistance and capacitance, in the case of thermal capacitance it dominates over resistance in the delay of heat transfer through the material. Again, while not dimensionally correct this can be thought of as C'>R.

As used in this description, time delay, also known as time constant, is defined as that time to reach 63% of a final steady state value from an initial steady state condition.

Fundamentally this invention is the intentional creation of multiple alternating layers of materials with good thermal resistance and layers with good thermal capacitance, to create a thermal low-pass filter with at least 2 poles. A single pole low pass filter can only create a phase shift of a maximum of 90 degrees, no matter how large the R and C' are. A filter with 2 or more poles can achieve a phase shift of 90 degrees or more. A filter with a phase shift near 180 degrees, for an oscillating temperature source with a period of 24 hours, has a particular utility.

As disclosed in the techniques herein the use of R and C' combinations can result in the delay of non-steady state temperature profiles and a phase delay of periodic temperature profiles. The characteristic delay time constant of such a structure is R*C' which has units of time. The resultant complex impedance of the RC' system has an equivalent impedance, including the time shift component, that is a magnification of the simple impedance of R alone.

Generally, there are two cases of heat transfer considered in the design of buildings. The type of insulation material used in the two cases can be the same, or it can be more specific to the particular application, like protecting structural steel beams from fire in a high-rise building.

Where structural integrity is important, thermal insulation is applied to protect structural elements for a set period of time, presumably long enough for people to escape and the local fire department to arrive. Houses are generally designed for a ½-hour fire-rating, while more important structures are designed for a 4-hour fire-rating, or more.

In addition to fire-rating, insulation is used in walls and between floors, to impede heat transfer, to reduce heating and cooling power requirements. For this purpose, insulation is added to achieve a desired R-rating, which generally indicates the amount of heat power that is transmitted through the insulated wall per degree of temperature difference across the thickness of the wall, per unit area of wall. The amount of such insulation required by local Building Codes varies widely, mostly proportional to the local climate. House exterior wall insulation can vary from as little as R13 to as much as R30, or more. Roof insulation generally has a higher R-value than wall insulation.

In the case of insulating to achieve an R-rating, the task is a matter of accumulating enough insulative value, total R-value, by adding more thickness of insulation, which carries an insulation value rated, R/inch. For example, a house exterior wall might be constructed on a frame of 4" studs (which are actually about 3.5" thick). Filling the gap with a regular fiberglass bat adds R13. A ⅝" thick gypsum board (aka sheetrock) on the interior surface adds about R0.6, and a ½" plywood layer on the outside adds about another R0.6, for a total of about R14 (ignoring the lower R value of the studs themselves). This total determines the amount of power used to heat the interior room to 70° F. (for example) while the outside temperature might be 40° F., and cool the interior when it's hotter than 70° F. outside.

In the case of insulating to achieve a fire-rating, the protective value is not just a matter of accumulating enough insulative value. It's also a function of what is being protected. Functionally, both the thermal mass and the critical temperature of the element being protected are factors in the fire-rating. These are accounted for in the Building Codes. Essentially, the fire-rating "time" describes the time it takes the mass of the protected element to reach its critical temperature given a high temperature source (generally about 2200° F.) diffusing through a given thickness of insulation.

The techniques described herein addresses both of these two insulation cases in a novel way, in light of the fact that in both cases, the driving heat source has a transitory nature.

"Realistic temperature-time profiles" now exist based on empirical models such as ones developed by C. R. Barnett starting in 2002. For a room, such as a bedroom in a home with typical furnishings (most of which are made of materials based on cellulose), the time-temperature profile of a fire is basically a steady rise after ignition from room temperature to 1200° C. in about 30 minutes, followed by a constant 1200° C. for 30 minutes, then an exponential decline heading back down asymptotically to room temperature, passing through 400° C. at about the 4 hour point, which is the temperature at which structural steel has lost about 10% of its strength.

In the specific case of a house fire, an internal fire may threaten to cause the structure to fail and the house to collapse. Building Codes address this by simply postulating a continuous 2200° F. source, requiring some amount of insulation to protect the structure for a rated period of time. However, as described in a series of papers, including one entitled "BFD curve: a new empirical model for fire compartment temperatures" by C. R. Barnett in the Fire Safety Journal of October 2002, a "real" fire has a finite time-temperature profile. The BFD1 curve is roughly described as, a quick rise in room temperature to 1200° C. in ½ hour, followed by a constant 1200° C. for another ½ hour, then an exponential drop back toward normal room temperature over hours.

In the case of the basic R-value problem, the basic model of a constant inside-outside temperature difference is basically true only for the average long-term seasonal component. There is also an important day-night temperature swing, with a predictable period of 24 hours. This outside temperature swing can be 30° F. or more, while it is typically desirous to maintain an inside temperature of about 70° F.

In light of the transitory or oscillatory components of heat transfer in a building, a rigorous mathematical model can be used which results in an understanding of the system, and wall system designs with beneficial performance improvements in both heat transfer cases, and a new interesting feature in the oscillatory case.

Using Fourier's Heat Equation, which includes time dependency, the inventor analyzed walls, and walls constructed from cascaded sections, each cascaded section having a layer of high insulative value (thermal resistance R), and a layer of high heat capacity (thermal capacity C'). Each section of two layers forms a thermal filter of first-order. Such filters have both attenuation characteristics and phase delaying characteristics. Mathematically, a first-order filter section can produce a phase delay of up to 90 degrees, at a high RC' to time ratio. Cascaded filters have approximately additive attenuations and phase shifts.

Additionally, to describe the best embodiments of the present techniques, a selection of palette materials, for both the R and C' components, where each can withstand the peak temperature to which it will be subjected, in its particular layer in the wall system was analyzed and used. Examples of some candidate materials with superior temperature capability are "mineral fiber" in sheet or board form for high thermal resistance R, and concrete in sheet or board form for high thermal capacitance C'.

Additionally, the concrete sheet (such as HardieBacker® Cement Board), which can be used as an inner layer, can hold a fastener such as a screw, which is beneficial for purely mechanical reasons.

In an example, here is a design of a more sophisticated thermal filter to protect a structural element inside a wall. A light-gauge steel stud in a wall is used in this example case. Structural steel loses 10% of its strength at 400° C., so the design keeps the stud temperature below 400° C. The excitation time-temperature profile will be the BFD1 curve referenced above, as a representative realistic finite fire. Consider a two-section (second order) system protecting a stud made of 1/16" thick steel. The sections are composed as follows, with layer1 as the surface exposed to the fire, and layer4 in contact with the stud.

Layer1=½" USG Micore® 300 Mineral Fiber Board, high density mineral fiber board
Layer2=¼" JamesHardie HardieBacker® Cement Board, high density concrete board
Layer3=1.5" ROCKWOOL™ COMFORTBOARD™ 80, medium density mineral fiber board
Layer4=¼" HardieBacker® Cement Board, high density concrete board This system has a total R-value, from the sum of its parts, of R8.3, with a total thickness of 2.5". It produces a peak temperature at the stud of about 215° C., at time point 410 minutes from the start. A longer duration fire and or thinner Layer would cause higher peak temperatures.

Comparing this performance to that of the zero-order system of only simple thermal resistance R, also with a total thickness of 2.5". Using all COMFORTBOARD™ 80 as an example, this system would have an R12, but allows a peak temperature of 300° C. versus the 215° C. of the system above. The difference in performance is due to the higher-order nature of the filter system.

In another example we consider the case of a 30° F. outside day-night temperature swing about 70° F. (70° F.+−15° F.), with a constant 70° F. inside temperature. Consider a wall system, similar to the one above, but symmetric about an inner layer of 4" of fiberglass, which could be the layer in which there are also 4" studs.

The sections are composed as follows, with layer1 on the outside exposed to 70°+−15° F., and layer7 on the inside exposed to a constant 70° F. Layer1 on the outside, could additionally be dressed with siding of various sorts, which would further insulate the house.

Layer1=½" USG Micore® 300, high density mineral fiber board
Layer2=¼" James Hardie HardieBacker® Cement Board, high density concrete board
Layer3=1.5" ROCKWOOL™ COMFORTBOARD™ 80, medium density mineral fiber board
Layer4=4" fiberglass bat
Layer5=1.5" ROCKWOOL™ COMFORTBOARD™ 80, medium density mineral fiber board
Layer6=¼" HardieBacker® Cement Board, high density concrete board
Layer7=½" USG Micore® 300, high density mineral fiber board This system has a total R-value, from the sum of its parts, of R30, with a total thickness of 8.5". This is a well-insulated exterior wall, which could also be achieved by the appropriate thickness of purely insulative (thermally resistive) material. However, this system is also approximately a third-order filter. From analyzing its response to an exterior oscillation of +−15° F. with a sinusoidal period of 24 hours, based on the actual heat power that moves through the wall system, the effective R-value is R84, or 2.8× better than the simple zero-order (pure-R (resistive)) equivalent.

Further, it can be seen from the analysis that the heat power passing through layer1 is 180 degrees out of phase from the power passing through layer7. The practical interpretation of this effect is that, the little heat power that reaches the inside layer due to heat of the previous afternoon at 4 PM, adds that heat to the inside of the house at 4 AM, when the other lower R-value elements, like windows, are leaking their peak power outward. The converse is true at the inside surface at 4 PM, being slightly cooled by the effects of the previous early morning. This effective is due to the complex nature of a higher-order RC filter, and can only be passively produced that way.

FIG. 1 illustrates, generally at 100, one embodiment of the invention showing a cross-section view of a house wall that does not contain a load-bearing element and without concern for an internal structural element, for example, an interior wall section, is a wall system that protects adjacent rooms from a 230° C. self-ignition temperature. Shown is a five layer system (102, 104, 106, 108, 110), about a thick central inner layer 106, comprising: outer layers 102 and 110, median layers 104 and 108, and a thick central inner layer 106. While the relative width dimensions vary as shown, the invention is not so limited and the five layer system (102, 104, 106, 108, 110), can be symmetric about a thick central inner layer 106. That is, the width of 102 and 110 can be equal, and the width of 104 and 108 can be equal, and are symmetric about a centerline of 106.

Figure 2:
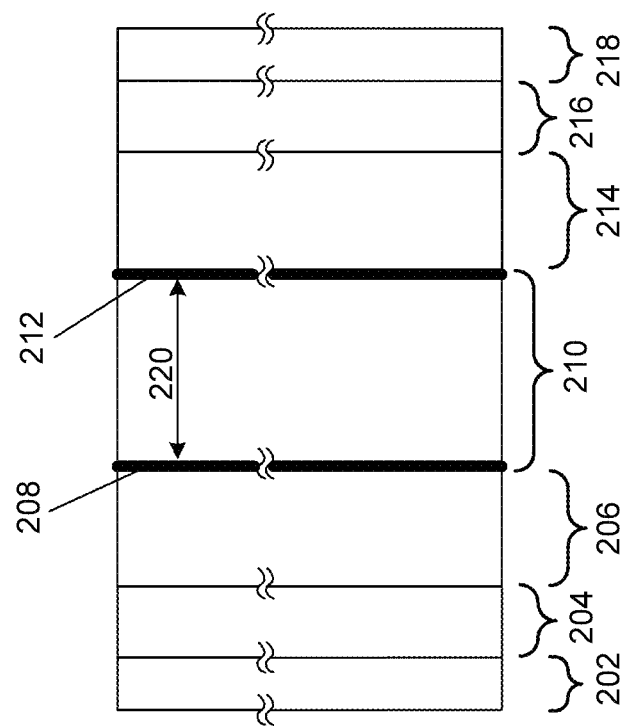
FIG. 2 illustrates, generally at 200, showing a cross-section view of a house wall that contains a load-bearing element.

FIG. 2 illustrates, generally at 200, one embodiment of the invention showing a cross-section view of a house wall that contains a load-bearing element (internal structural element) 210, with the cross-section cut through the load-bearing element 210. This example shows a "steel stud" 210, which in cross-section is basically two thin slices of steel 208 and 212 separated by a gap of the stud's depth dimension 220 (generally about 4" or 6"). An adjacent cross-section not through the steel stud would look like FIG. 1. Shown is a nine layer system (202, 204, 206, 208, 210, 212, 214, 216, 218), symmetric about a thick inner layer 210, comprising (listing from the outer layer to inner layer, sequentially): outer layers 202 and 218, first intermediate layers 204 and 216, second intermediate layers 206 and 214, thin steel layers 208 and 212, and a central inner gap between the planes of steel 208 and 212 denoted as 220. A cross-section through a wall with wood studs would just show solid wood as the inner three layers (210 made up of 208, 220, and 212). While the respective layers are shown the same width and symmetric about a center line of 210, the invention is not so limited and the various layers (202, 204, 206, 208, 212, 214, 216, and 218) and the central inner gap 220 can be the same or different widths.

Considering a wall section without concern for an internal structural element, presumably an interior wall section, is a wall system that protects adjacent rooms from a 230C self-ignition temperature.

The requirement for the outer layer that is exposed directly to the "realistic" temperature-time profile should include tolerance to the peak temperature of approximately 1200° C. Such materials are rare in the construction industry, but a relatively new class of materials called Mineral Wool is available which does withstand 1200° C. For this outer layer, which is also the layer the room occupants interact with, it is generally desirous for it to have mechanical properties typically assumed by the occupants of rooms. Such characteristics include: abrasion resistance, rupture resistance, and sufficient strength to hang a modest picture from a nail. The specific sub-class of mineral wool with density in the 20 pounds per cubic feet range has such mechanical properties.

The center layer is the main heat insulative layer to protect the adjacent room from a 230° C. self-ignition temperature. It is composed of a substantial thickness of low density (higher R-value) mineral wool.

The intermediate layers between the outer layers and the inner layer are incorporated to serve multiple purposes. Intermediate layers of a high-density material, like concrete board, provide significant heat capacity to absorb heat. It also has great strength for the self-support of the system, and allows for a much greater weight to be hung on the wall by driving a screw through both the outer and first intermediate layers. Concrete board is a candidate material capable of withstanding about 600° C. temperatures, and has a high heat capacity, further increasing the effectiveness of the center insulation layer.

Figure 3:
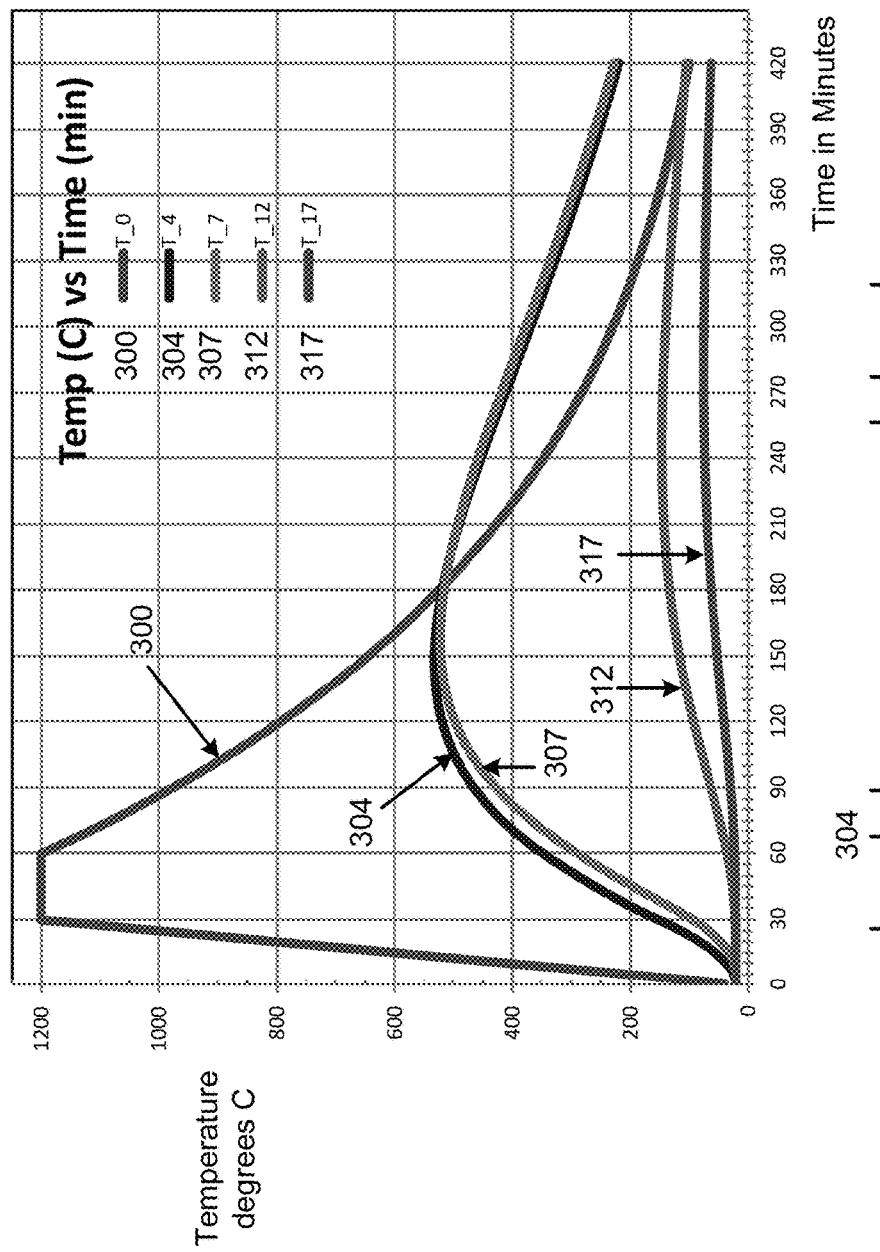
FIG. 3 illustrates, generally at 390, an interior non-structural wall section.

FIG. 3, illustrates generally at 390, one embodiment for example, specifically for the case of an interior non-structural wall section, depicted using FIG. 3, an example system determined with a simple FEM (Finite Element Method) using a spreadsheet, with a stackup as follows: outer layers (340, 342) of ½" USG Micore® 300, intermediate layers (344, 346) of ¼" HardieBacker® Cement Board, and an inner layer (348) of 2" of ROCKWOOL™ COMFORTBOARD™ 80. This stackup has the thickness of a typical wall and will have and maintain sufficient structural integrity per California Building Code, and keep the outer layer in the adjacent room, from temperatures above 200° C., with an unmitigated "realistic" fire in the room.

In FIG. 3, shown along the vertical (Y) axis is the temperature in degrees Celsius (° C.), and along the horizontal (X) axis is the time in minutes. At 300 is a room temperature profile BFD1 curve to which a first outer layer is exposed. For example, the temperature rises rapidly in the first 30 minutes presumably due to materials catching fire and burning in the room as the room temperature rises. The room temperature 300 maintains that maximum temperature for another 30 minutes (30-60 minutes) because there is a maximum temperature that the room can obtain with the fuels therein as they burn fully. The room temperature 300 then begins a decline from 60 minutes to approximately 500° C. at 180 minutes and then declines at 420 minutes to approximately 100° C. At 304 is a temperature profile of the interface between the first outer layer and the first intermediate layer as the room 300 transfers heat through the first outer layer to the first intermediate layer. The first intermediate layer temperature profile 304 can be seen to rise slower than room temperature profile 300 and reaches a maximum temperature of approximately 550° C. at 150 minutes. At 307 is the temperature profile at the interface of the first intermediate layer and an inner layer interface. At 312 is the temperature profile at the interface of the inner layer to a second intermediate layer. At 317 is the temperature profile of a second outer layer which is a wall of a next room 320.

Figure 4:
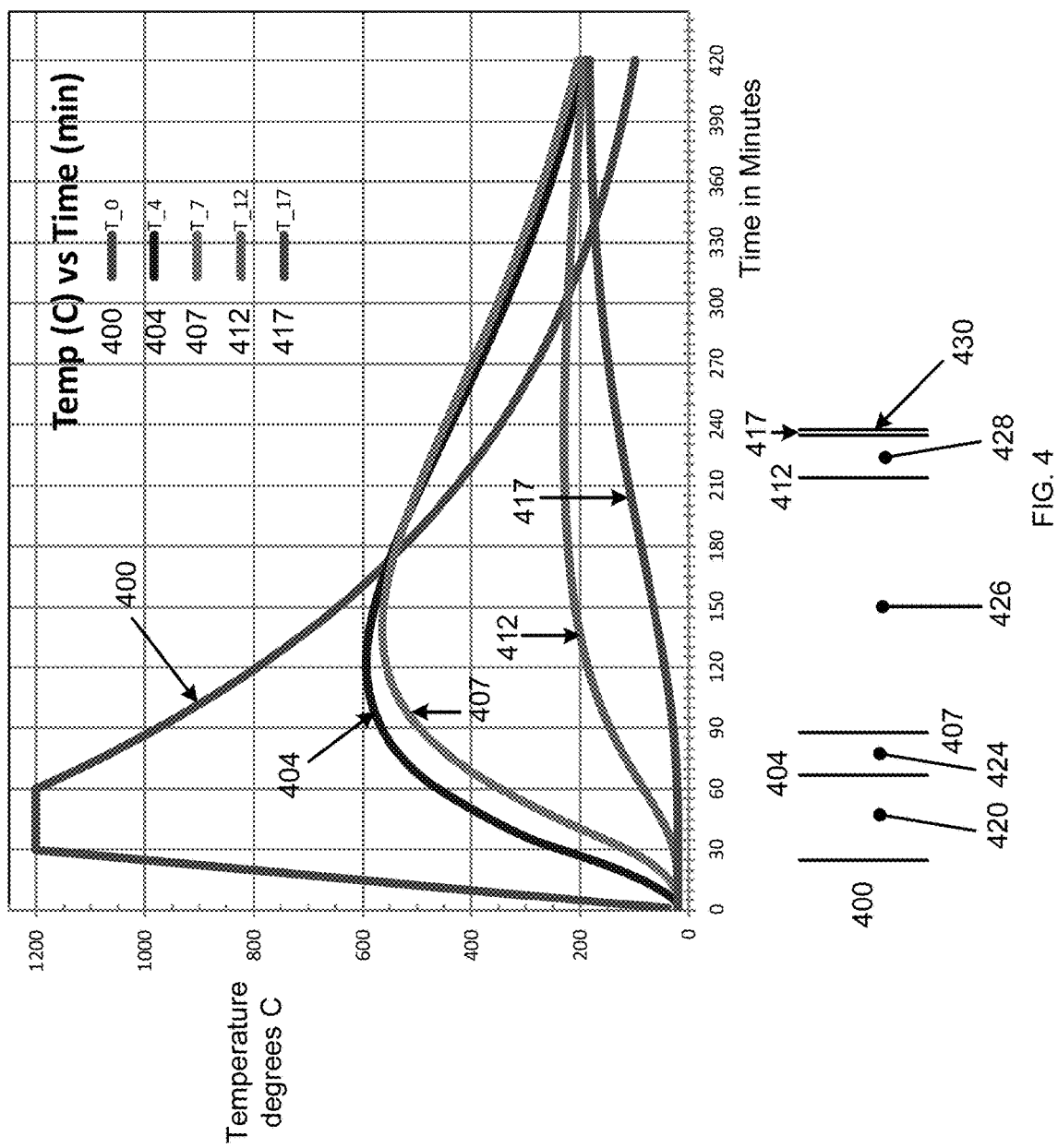
FIG. 4 illustrates, generally at 490, a model of one-half of an exterior structural wall system modeled with fire on one side and showing temperature profiles to the structural element.

FIG. 4, illustrates generally at 490, one embodiment for example, a model of one-half of an exterior structural wall system modeled with fire on one side and showing temperature profiles to the internal structural element. The stackup is as follows: outer layer (420) of ½" USG Micore® 300, intermediate layer (424) of ¼" HardieBacker® Cement Board, an inner layer (426) of 1.5" of ROCKWOOL™ COMFORTBOARD™ 80, an innermost layer (428) of ¼" HardieBacker® Cement Board, and then a structural element of steel 0.12" thick (430). This stackup will have and maintain sufficient structural integrity per California Building Code. As noted, this is a model of one-half of an exterior structural wall system, and after the steel structural element another stackup from the steel to a wall of an inner room is possible. This embodiment is to show the temperature profiles in order to protect the structural element.

In FIG. 4, shown along the vertical (Y) axis is the temperature in degrees Celsius (° C.), and along the horizontal (X) axis is the time in minutes. At 400 is an outside fire temperature profile to which a first outer layer 420 is exposed. For example, the temperature rises rapidly in the first 30 minutes presumably due to the fire. The fire temperature 400 maintains that maximum temperature for another 30 minutes (30-60 minutes). The fire temperature 400 then begins a decline from 60 minutes to approximately 500° C. at 180 minutes and then declines at 420 minutes to approximately 100° C. At 404 is a temperature profile of the interface between the first outer layer 420 and the intermediate layer 424 as the fire 400 transfers heat through the first outer layer 420 to the first intermediate layer 424. At 407 is the temperature profile at the interface of the first intermediate layer 424 and an inner layer 426 interface. The temperature profile 407 can be seen to rise slower than the fire temperature profile 400 and the first intermediate layer temperature profile 404 and temperature profile 407 reaches a maximum temperature of approximately 550° C. at 140 minutes. At 412 is the temperature profile at the interface of the inner layer 426 to the innermost layer 428. At 417 is the temperature profile of the steel structural member 430. While there is gap shown at 417, in actuality there is not a gap between structural steel member 430 and the closest layer 428. The gap is there to simply illustrate that there is a structural member 430 which is in contact with the innermost layer 428.

As can be seen in FIG. 4 at temperature profile 417 is that the structural steel member 430 reaches a peak temperature of slightly less than 200° C. at 420 minutes. What is significant is that beyond this time the temperature of the structural member 430 will continue to fall as the fire 400 is below that of the structural member steel 430 as shown in the temperature profile 417 as are the temperature profiles for the other materials as shown in temperature profiles 404, 407, and 412. This 200° C. is significantly below the point at which steel loses structural strength. Steel loses about 15% of its strength at 400° C., and loses approximately 50% of its strength at 650° C., and melts at approximately 1500° C. Thus, the technique disclosed protects the structural element very well. In fact, structural steel has about 30% more strength at 250° C. Wood ignites at about 230° C. Therefore, even though as illustrated FIG. 4 is for only one-half of an exterior wall the structural member 430 is kept below the ignition temperature of wood.

Figure 5:
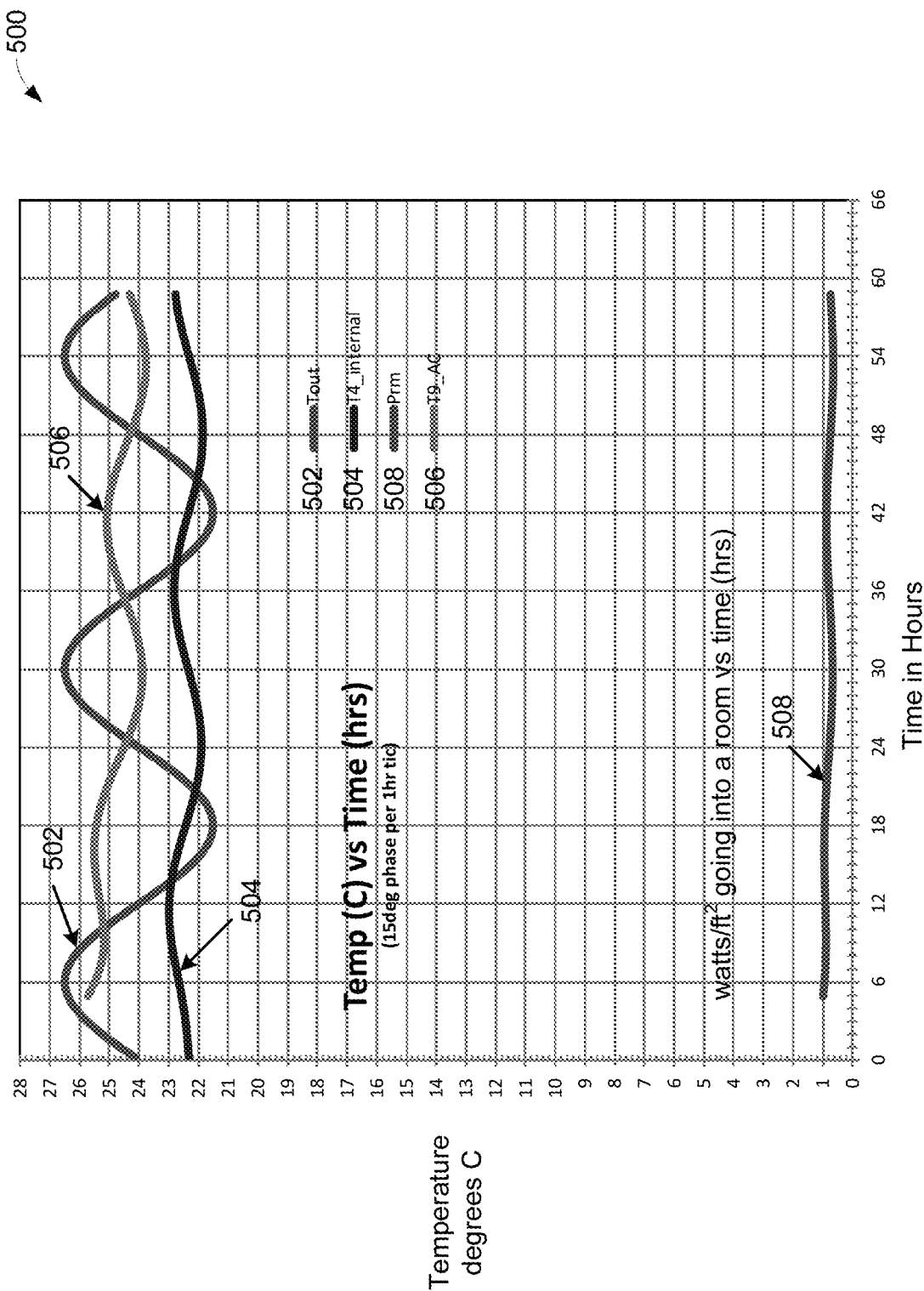
FIG. 5 illustrates, generally at 500, the case of an exterior wall system with sinusoidal external temperature.

FIG. 5, illustrates generally at 500, one embodiment for example, specifically for the case of an exterior wall system with sinusoidal external temperature. In this example, the stackup is as follows from the outside wall to the interior: layer 1 0.75" of COMFORTBOARD™ 80, layer 2 0.75" of COMFORTBOARD™ 80, layer 3 0.5" of HardieBacker® Cement Board, layer 4 2" of fiberglass, layer 5 2" of fiberglass, layer 6 0.25' of 0.25" of HardieBacker® Cement Board, and layer 9 0.5" of Micore® 300. At 502 is shown Tout which is the outside temperature which over a 24 hour period varies from 26.5° C. to 21.5° C. (~80° F. to 71° F.). At 504 is T4_internal which is the internal temperature between layer 4 and layer 5 (i.e. in the middle of the fiberglass), at 506 T9_AC is a magnified and shifted version of the layer 9 temperature near the inside a room, that better shows the temperature phase shift from 502. At 508 is Prm which indicates watts/ft² going into a room. The vertical scale for 508 is not temperature but rather watts/ft² which in this case hovers around 1. As can be seen the temperature of an inside room 506 stabilizes varying from about 24° C. to 25° C. (~75° F. to 77° F.). In this scenario the effective thermal impedance, due to the RC' combination, is 2.8 times the purely resistive R-value impedance component alone.

The embodiments disclosed above are non-limiting and other embodiments with different stackups can yield different performance. For example, having an exterior "realistic" fire, internal structural elements such as wood and/or steel, while also keeping the interior wall below kindling temperature can be achieved to minimize thickness or the wall and cost. That is, one less expensive solution is: ½" gypsum (or Micore® 300)+¼" HardieBacker® Cement Board+1" COMFORTBOARD™ 80 will protect wood or steel from the "realistic" profile (30 min at 1200° C. peak), even with a 90 minute peak. The same sandwich on the inside (re-flected (i.e. symmetrical) about the studs) will also keep the inside below the kindling temperature of paper. The total wall system, with 4" studs (3.5" actual size) would be about 7" thick.

Another embodiment for an inside non-structural wall system is ½". Micore® 300+¼" HardieBacker® Cement Board+2" COMFORTBOARD™80+¼" HardieBacker® Cement Board+½" Micore® 300. This forms a 3.5" thick wall, which is in the range for a normal thickness wall.

The next two intermediate layers, between the outer layer and the structural steel layer, have to serve multiple purposes together. They can be accomplished in either order. The configuration where the strong and dense intermediate layer is placed next to the outer layer is better for the human interface aspects but requires more total insulation. In this embodiment the first intermediate layer is a layer of high strength, and density, providing significant heat capacity. A candidate material is concrete board. This provides great strength for the self-support of the system, and allows for a much greater weight to be hung on the wall by driving a screw through both the outer and first intermediate layers. Concrete board is capable of withstanding about 600° C. temperatures. The thermal resistance (R-value) of the outer layer will protect the concrete from reaching that temperature. In the present configuration, the second intermediate layer is a thickness of a low density (higher R-value) mineral wool to protect the steel layer from reaching 400° C.

Alternatively, the high heat capacity of the concrete board can be the intermediate layer that is placed against the steel to additively absorb heat. The other intermediate layer, placed against the outer layer, would be the high thermal resistance (R-value) layer protecting both the concrete and the steel from reaching 400° C. This configuration requires less total insulation and keeps the concrete board at an even lower temperature. The house designer might choose the first configuration on the inside layers of an outside wall system, to protect from a fire inside the house, and the alternative configuration on the outer layers of the wall system to protect from a fire on the outside of the house.

Specifically, for the case of the exterior wall section, with load bearing light gage steel studs, depicted using FIG. 2, determined with a simple FEM using a spreadsheet, is the following example system, with layers listed sequentially starting from the surface inside the house, and ending at the outer surface on the exterior of the house: ½" USG Micore® 300 on an intermediate layer of ¼" HardieBacker® Cement Board, an intermediate layer of 2" of ROCKWOOL™ COMFORTBOARD™ 80, the inner plane of the steel stud, the outer plane of the steel stud, a layer of ¼" Hardie-Backer® Cement Board, an intermediate layer of 2" of ROCKWOOL™ COMFORTBOARD™ 80, an outer layer of ½" USG Micore® 300. On this last outer layer a house siding or facade can be applied. This system will protect the steel from a fire on either the inside or the outside of the building, and protect either the inside or the outside of the building from ignition temperature from the other side of the wall, with a unmitigated "realistic" fire on the inside or the outside of the house.

Similarly, by simple FEM using a spreadsheet and appropriate high temperature materials, one can model and design a wall system to optimize performance and cost for various specific applications, including a wall with wood studs. One element of these techniques is to use materials, at each layer, which can withstand the peak temperature that that layer will attain. Similarly, this method and the embodiment examples apply to ceilings with roof rafters or other support system above, and to floor systems with floor joists or other support system below.

These candidate materials are readily available from reputable manufacturers of building materials. They can be installed in a building much like is done with more common materials. The non-load bearing wall system, described in association with FIG. 1, could be pre-assembled, as a structural insulated panel (SIP), composed of Hardie-Backer® Cement Board skins glued or fastened on each side of a 2" thick panel of COMFORTBOARD™ 80. This section can be erected like a conventional fir framed wall section. The Micore® 300 panels can then be applied by the finisher, the same as gypsum board would be applied and finished.

The techniques described can be used to provide fire resistance to structures to provide protection against outside wall to inner wall heat transmission and inner wall to another inner wall heat transmission, as well as wall to inner structural member.

For example, to make an outer wall to inner wall fire resistant it is necessary to consider the structural member in a wall and if it is load bearing. Thus, it is necessary to make the outer wall to load bearing structure such that when the outer wall is exposed to a higher temperature profile that the inner structural member is protected so as not to lose strength and collapse or be unable to support the wall, ceiling, etc. Likewise, at the same time this inner structural member is being protected the inner wall must not reach a temperature that causes the inner room to ignite and fuel the destruction of the inner room and wall further. With the techniques described these can be achieved by utilizing thermal capacitance in combination with thermal resistance to establish a much higher effective thermal resistance. This higher effective resistance is achieved by the introduction of thermal capacitance.

With this higher effective thermal resistance it is possible to achieve 24 hour thermal stabilization such that inner rooms of a structure have only small variations in temperature over a 24 hour period. That is, the heating/cooling requirements for such a structure are minimal.

Thus, with a transient and cyclical function such as but not limited to outside walls exposed to higher/lower temperatures (e.g. sun/snow) room to room and even fire to structural members can be protected and temperature profiles achieved to maintain the structure from heat damage.

Nor is the invention limited to only higher temperature applications. For example, the interior rooms of artic buildings can be protected from the cold outside using the techniques described. That is, any thermal system where a high effective thermal resistance is needed can use the techniques described.

In one embodiment a stackup of materials is an outer wall member made of a first high thermal resistance material joined to a first high capacitance material which is joined to a second high thermal resistance material which is joined to a second high capacitance material which is in contact with an inner wall structural member such as, but not limited to, a wood or steel stud. The wood or steel stud space may also be filled with an insulative material. Further the stackup from the wood or steel stud to an inner room wall may be, for example, made of a third high thermal resistance material in contact with the wood or steel stud on one side and joined to a third high capacitance material which is joined to a fourth high thermal resistance material which is joined to a fourth high capacitance material which forms the inner room wall.

While the firewall apparatus has been described it is to be understood that attachment to a structure is possible by, for example, but not limited to, screws, nails, suitable high temperature glue, suitable high temperature silicone, suitable high temperature epoxy, ceramic screws, attachment fixtures such as, but not limited to, clamps, retaining fixtures, grooves in other materials such as concrete, steel, etc.

COMFORTBOARD™ 80 is a product of ROCKWOOL™. HardieBacker® Cement Board is a product of JamesHardie. Micore® 300 Mineral Fiber Board is a product of USG. While these have been used to illustrate the techniques disclosed, it is to be understood that similar products can be used to affect the techniques disclosed. For example, mineral wool insulation is made by a variety of manufacturers as is cement board and fiber board.

Thus a Method and Apparatus for a Firewall have been described.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, and other changes may be made without departing from the scope of the present invention.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a Method and Apparatus for a Firewall have been described.

What is claimed is:

1. A high effective R-value wall system comprising: multiple alternating layers of materials, where said layers of materials have alternating good thermal resistance and good thermal capacitance; and where said system forms a thermal filter with 2 or more poles, wherein each pole comprises a sequential pair of adjacent layers of a good thermal resistance material followed by a layer of a good thermal capacitance material, to achieve a thermal phase shift of greater than 90 degrees to an oscillating temperature source with a period of 24 hours; wherein said thermal filter system has a nominal R-value and an effective R-value, wherein said nominal R-value is the total R-value equal to the sum of the R-values of the layers of the system and the effective R-value is based on the actual heat power that moves through the system, wherein the effective R-value is greater than or equal to 2.8 times the nominal R-value.

* * * * *